United States Patent
Oike et al.

(10) Patent No.: US 7,321,480 B2
(45) Date of Patent: Jan. 22, 2008

(54) THIN-FILM MAGNETIC HEAD HAVING MAGNETIC LAYERS OF DIFFERENT THICKNESSES AND FABRICATION METHOD FOR SAME

(75) Inventors: Taro Oike, Tokyo (JP); Kiyoshi Noguchi, Tokyo (JP); Shin Narushima, Tokyo (JP); Takamitsu Sakamoto, Tokyo (JP); Hiraku Hirabayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 383 days.

(21) Appl. No.: 10/917,476

(22) Filed: Aug. 13, 2004

(65) Prior Publication Data
US 2005/0057851 A1    Mar. 17, 2005

(30) Foreign Application Priority Data
Sep. 11, 2003    (JP)    ............................. 2003-319662

(51) Int. Cl.
*G11B 5/39*    (2006.01)
(52) U.S. Cl. .................................. 360/126
(58) Field of Classification Search ................ 360/126
See application file for complete search history.

(56) References Cited

U.S. PATENT DOCUMENTS

| | | | |
|---|---|---|---|
| 5,283,942 A * | 2/1994 | Chen et al. ............ | 29/603.18 |
| 5,285,340 A | 2/1994 | Ju et al. | |
| 5,473,491 A | 12/1995 | Fujisawa et al. | |
| 6,043,959 A | 3/2000 | Crue et al. | |
| 6,137,652 A * | 10/2000 | Ezaki et al. ............ | 360/317 |
| 6,333,841 B1 | 12/2001 | Sasaki | |
| 6,477,005 B1 * | 11/2002 | Sasaki .................... | 360/126 |
| 6,487,041 B2 * | 11/2002 | Yamanaka et al. ...... | 360/126 |
| 6,490,135 B1 * | 12/2002 | Sannino et al. ........ | 360/235.8 |
| 6,657,816 B1 * | 12/2003 | Barr et al. .............. | 360/126 |
| 6,687,096 B2 * | 2/2004 | Sasaki et al. .......... | 360/317 |
| 6,751,052 B1 * | 6/2004 | Tagawa et al. ......... | 360/126 |
| 6,826,015 B2 * | 11/2004 | Chen et al. ............ | 360/126 |

FOREIGN PATENT DOCUMENTS

| | | |
|---|---|---|
| JP | 6-28626 | 2/1994 |
| JP | 6-314413 | 11/1994 |
| JP | 11-288503 | 10/1999 |
| JP | 11-353616 | 12/1999 |
| JP | 2001-118214 | 4/2001 |
| JP | 2001-209909 | 8/2001 |
| JP | 2003-85709 | 3/2003 |

\* cited by examiner

*Primary Examiner*—Brian E. Miller
(74) *Attorney, Agent, or Firm*—McGinn IP Law Group, PLLC

(57) ABSTRACT

A thin-film magnetic head includes a lower magnetic layer, an upper magnetic layer, a recording gap layer, and a thin-film coil. The lower magnetic layer has a first magnetic pole tip layer, and a first yoke layer which is connected to the first magnetic pole tip layer. The first yoke layer has an extended part which is relatively thick and a reduced part which is relatively thin in the area in which the first yoke layer confronts the first magnetic pole tip layer, the extended part being positioned on the side of the air bearing surface. Further, the first magnetic pole tip layer is connected to the first yoke layer at the extended part, and is insulated from the first yoke layer at the reduced part.

6 Claims, 15 Drawing Sheets

| (Condition) | Track width | 0.3 μm |
|---|---|---|
| | PED | 2.5 μm |

| Writing current (mA) | Normalized TAA | | |
|---|---|---|---|
| | dTH=0.2 μm | dTH=0.3 μm | dTH=0.5 μm |
| 0 | 0 | 0 | 0 |
| 5 | 0.057 | 0.032 | 0 |
| 10 | 0.298 | 0.24 | 0.17 |
| 15.3 | 0.781 | 0.708 | 0.511 |
| 20.9 | 0.94 | 0.905 | 0.846 |
| 25 | 1 | 0.984 | 0.951 |
| 30.6 | 0.99 | 0.99 | 0.969 |
| 35 | 0.95 | 0.99 | 0.997 |
| 40 | 0.9 | 0.992 | 1.006 |
| 45 | 0.85 | 1.006 | 0.989 |
| 50 | 0.8 | 1 | 1.006 |
| 55 | 0.75 | 1.006 | 1 |
| 60 | 0.702 | 1 | 0.951 |
| 25/60 (note) | 1.425 | 0.984 | 0.951 |

(note) The ratio of normalized TAA with writing current of 25mA and normalized TAA with writing current of 60mA

| (Condition) | Track width | 0.3 μm |
| --- | --- | --- |
| | PED | 2.5 μm |

| Writing current (mA) | Normalized TAA | | | |
| --- | --- | --- | --- | --- |
| | dTH=0.5μm dTH/PED=0.2 | dTH=1.0μm dTH/PED=0.4 | dTH=1.5μm dTH/PED=0.6 | dTH=2.0μm dTH/PED=0.8 |
| 0 | 0 | 0 | 0 | 0 |
| 5 | 0 | 0 | 0 | 0 |
| 10 | 0.17 | 0.099 | 0.075 | 0.051 |
| 15.3 | 0.511 | 0.407 | 0.278 | 0.149 |
| 20.9 | 0.846 | 0.728 | 0.584 | 0.327 |
| 25 | 0.951 | 0.885 | 0.807 | 0.595 |
| 30.6 | 0.969 | 0.944 | 0.872 | 0.774 |
| 35 | 0.997 | 0.969 | 0.92 | 0.872 |
| 40 | 1.006 | 0.992 | 0.962 | 0.932 |
| 45 | 0.989 | 1.006 | 0.994 | 0.982 |
| 50 | 1.006 | 0.989 | 1 | 1.012 |
| 55 | 1 | 1.006 | 1.009 | 1.012 |
| 60 | 0.951 | 1 | 1 | 1 |
| 25/60 (note) | 0.951 | 0.885 | 0.807 | 0.595 |

(note) The ratio of normalized TAA with writing current of 25mA and normalized TAA with writing current of 60mA

| (Condition) | Track width | 0.3 μm |
|---|---|---|
| | PED | 2.5 μm |

| dTH/PED | TAA(25)/TAA(60) | | |
|---|---|---|---|
| | PED=1.5 | PDE=2.5 | PDE=3.5 |
| 0.2 | 0.9 | 0.951 | 0.92 |
| 0.4 | 0.85 | 0.885 | 0.822 |
| 0.6 | 0.75 | 0.807 | 0.78 |
| 0.8 | 0.7 | 0.61 | 0.65 |

| (Condition) | Track width | 0.3 μm |
|---|---|---|
| | Psuedo-throat height TH | 0.5 μm |
| | PED | 2.5 μm |

| Writing current (mA) | Normalized TAA | |
|---|---|---|
| | Prior art | Embodiment |
| 0 | 0 | 0 |
| 5 | 0 | 0 |
| 10 | 0.051 | 0.17 |
| 15.3 | 0.149 | 0.511 |
| 20 | 0.327 | 0.846 |
| 25 | 0.595 | 0.951 |
| 30 | 0.774 | 0.969 |
| 35 | 0.872 | 0.997 |
| 40 | 0.932 | 1.006 |
| 45 | 0.982 | 0.989 |
| 50 | 1.012 | 1.006 |
| 55 | 1.012 | 1 |
| 60 | 1 | 0.951 |
| 25/60 (note) | 0.595 | 0.951 |

(note) The ratio of normalized TAA with writing current of 25mA and normalized TAA with writing current of 60mA

THIN-FILM MAGNETIC HEAD HAVING MAGNETIC LAYERS OF DIFFERENT THICKNESSES AND FABRICATION METHOD FOR SAME

BACKGROUND OF THE INVENTION

1. Field of the Invention

The present invention relates to a thin-film magnetic head having at least an inductive magnetic transducer and to a fabrication method for such a thin-film magnetic head, and further, to a head gimbal assembly and hard disk device which contain a thin-film magnetic head.

2. Description of the Related Art

Dramatic advances have been continuing in the areal density of hard disk devices, and recent years, the areal densities in the range of 100 gigabits per square inch have been realized. As a thin-film magnetic head, a composite thin-film magnetic head is widely used which has both a reproducing head having a magnetoresistance (MR) element for reproducing and a recording head having an inductive magnetic transducer for writing. For the improvements in areal density of such a composite thin-film magnetic head, improvements in performance both for reproducing and recording are necessary. An anisotropic magnetoresistance (AMR) elements which employ anisotropic magnetoresistance has been shifted to giant magnetoresistance (GMR) elements which employ giant magnetoresistance as a means of improving the reproducing capabilities.

Recording to a medium is realized by sending a current which changes in accordance with the content to be recorded to a coil, then magnetizing the medium by the magnetic field leaked from magnetic poles which are magnetized based on the principle of electromagnetic induction. In order to realize this principle, the recording head is provided with: two opposing magnetic pole tips which confront each other at an air bearing surface of the head, a lower magnetic layer and an upper magnetic layer which respectively include each of these tips, a recording gap layer which is provided between the magnetic pole tip of the lower magnetic layer and the magnetic pole tip of the upper magnetic layer, and a thin-film coil insulated from the lower magnetic layer and the upper magnetic layer. Increasing the areal density further requires miniaturization especially of the lower magnetic layer, the upper magnetic layer, and the recording gap layer.

One major problem which accompanies miniaturization of a magnetic head of this construction is the variations in fabrication accuracy. A thin-film magnetic head is fabricated through the use of semiconductor fabrication technology in which one wafer is used to simultaneously fabricate a plurality of thin-film magnetic heads. Suppressing the variation in the magnetic pole width of a plurality of thin-film magnetic heads which are fabricated from one wafer becomes difficult when the effective recording track width is reduced to 0.3 μm or less.

Technology for fabricating a thin-film magnetic head having a small magnetic pole width is disclosed in Japanese Patent Laid-Open Publication No. 353616/99 (FIG. 9) and U.S. Pat. No. 6,043,959 (FIG. 16), wherein an upper magnetic layer is divided into a magnetic pole tip layer which defines the magnetic pole width and a yoke layer which is much wider. As another technique for fabricating a thin-film magnetic head having a small magnetic pole width, a trimming technique is disclosed in the above-described gazette and specification. In this technique, the magnetic pole tip of the upper magnetic layer is used as a mask for etching the recording gap layer and at least a portion of the magnetic pole tip of the lower magnetic layer facing the recording gap layer, whereby the sidewalls of the magnetic pole tip of the upper magnetic layer, the recording gap layer, and the portion of the magnetic pole tip of the lower magnetic layer are aligned. Dry etching is used in the above-described etching.

As another known technology for fabricating a thin-film magnetic head having a small magnetic pole width, Japanese Patent Laid-Open Publication No. 028626/94 (FIG. 5) and Japanese Patent Laid-Open Publication No. 314413/94 (FIG. 1) disclose methods in which the shapes of the magnetic pole tip layer of the lower magnetic layer, the recording gap layer, and the magnetic pole tip layer of the upper magnetic layer are aligned. In this technology, the magnetic pole tip layer of the lower magnetic layer, a recording gap layer, and a magnetic pole tip layer of the upper magnetic layer are successively formed using one photoresist frame by plating method.

Another problem also exists that the recording characteristics deteriorate when the magnetic pole width which defines the recording track width is reduced in order to increase the recording density. In other words, a reduction of the magnetic pole width is accompanied by a reduction in the size of the magnetic pole tip, whereby the area of contact is decreased between these tips and the lower magnetic layer and the upper magnetic layer. As a result, the magnetic flux which is generated in the lower magnetic layer and upper magnetic layer is not effectively conveyed to the magnetic pole tips, resulting in degradation of the recording characteristics, thus leading to deterioration of overwrite characteristic which indicates the performance of overwriting.

Thus, increasing the contact area between the magnetic pole, the lower magnetic layer and the upper magnetic layer is effective for preventing deterioration of the recording characteristic. Alternatively, shortening the throat height is also effective for reducing the loss of magnetic flux. From these standpoints, a technique is disclosed in Japanese Patent Laid-Open Publication No. 118214/2001 (FIG. 3) in which a magnetic pole is formed along a curved insulation. In this configuration, an insulating layer for defining the throat height is formed on the base of the lower magnetic layer, following which a photoresist frame is formed, the photoresist frame then being used in a plating method for forming the magnetic pole tip layer of the lower magnetic layer, the recording gap layer, and the magnetic pole tip layer of the upper magnetic layer. The throat height is the length (height) from the air bearing surface to the position at which the gap between the two magnetic layers begins to open.

When the magnetic pole width is controlled by trimming the magnetic pole tip as shown in Japanese Patent Laid-Open Publication No. 353616/99 and U.S. Pat. No. 6,043,959, the magnetic pole width is controlled by dry etching. This arises the problem that the magnetic pole width in a plurality of thin-film magnetic heads which are fabricated from a single wafer widely varies.

In contrast, when one photoresist frame is used to form the magnetic pole tip layer of the lower magnetic layer, the recording gap layer, and the magnetic pole tip layer of the upper magnetic layer as shown in Japanese Patent Laid-Open Publication No. 28626/94 or Japanese Patent Laid-Open Publication No. 314413/94, the magnetic pole width is controlled by photolithography. In this case, the variation in the magnetic pole width in a plurality of thin-film magnetic heads which are fabricated using a single wafer can be greatly suppressed than in a case in which the magnetic pole width is controlled by dry etching. In addition, the photoresist frame can be formed accurately if the photoresist frame is formed on a flat surface. Accordingly, when a photoresist frame is formed on a flat surface to form the magnetic pole tip layer of the lower magnetic layer, the recording gap layer, and the magnetic pole tip layer of the upper magnetic layer, variation in the magnetic pole width can be further suppressed.

Nevertheless, in a thin-film magnetic head which is fabricated using the techniques disclosed in Japanese Patent Laid-Open Publication No. 28626/94 and Japanese Patent Laid-Open Publication No. 314413/94, the throat height is equal to the distance from the air bearing surface to the opposite end on the assembly of the magnetic pole tip layer of the lower magnetic layer, the recording gap layer, and the magnetic pole tip layer of the upper magnetic layer. As a result, when the above-described distance is long in a thin-film magnetic head, the throat height is also long, whereby magnetic field sufficiently strong for recording may not be generated at the air bearing surface. On the other hand, when the above-described distance is short, the contact area between the upper and lower magnetic pole tip layers and the upper and lower yoke layers is reduced, sufficient magnetic flux cannot be supplied to the magnetic pole tip layers from the yoke layers, whereby magnetic field sufficiently strong for recording may not be generated at the air bearing surface.

In the technique which is disclosed in Japanese Patent Laid-Open Publication No. 118214/2001, the photoresist frame is formed, not on a flat surface, but on a stepped surface produced by the insulating layer which defines the throat height. The photoresist frame is therefore difficult to be formed with accuracy, and when using this technique, the problem arises that variations in the magnetic pole width are difficult to be suppressed when the magnetic-pole width is as small as 0.3 µm.

SUMMARY OF THE INVENTION

In view of these problems, it is an object of the present invention to provide a thin-film magnetic head and fabrication method for a thin-film magnetic head which not only allows accurate formation of the magnetic pole tips which defines a small track width, but also enable an improvement in recording characteristics.

It is another object of the present invention to provide a head gimbal assembly as well as a hard disk device.

According to an embodiment of the present invention, a thin-film magnetic head includes: first and second magnetic layers each having a magnetic pole tip which confronts each other at an air bearing surface of the head which confronts a recording medium and being magnetically connected to each other at a remote position from the air bearing surface; a recording gap layer which is provided between the magnetic pole tip of the first magnetic layer and the magnetic pole tip of the second magnetic layer; a thin-film coil at least partially disposed between the first and second magnetic layers, and insulated from the first and second magnetic layers; and a substrate. The first and second magnetic layers, the recording gap layer, and the thin-film coil are stacked on the substrate, wherein the first magnetic layer is arranged closer to the substrate. The first magnetic layer has a first magnetic pole tip layer which includes the magnetic pole tip of the first magnetic layer, and a first yoke layer which is connected to the first magnetic pole tip layer. In the region in which the first yoke layer confronts the first magnetic pole tip layer, the first yoke layer has an extended part which is relatively thick and a reduced part which is relatively thin, the extended part being positioned on a side of the air bearing surface; wherein the first magnetic pole tip layer is connected to the first yoke layer at the extended part and magnetically insulated from the first yoke layer at the reduced part. The second magnetic layer has a second magnetic pole tip layer which includes the magnetic pole tip of the second magnetic layer and a second yoke layer which is connected to the second magnetic pole tip layer; wherein the first magnetic pole tip layer, the recording gap layer, and the second magnetic pole tip layer have substantially identical sectional profiles in parallel direction to an upper surface of the substrate.

An effect substantially equivalent to reducing the throat height can be obtained, whereby leakage of magnetic flux from the reduced part can be prevented. In addition, magnetic flux can be efficiently discharged from the extended part to the recording medium, whereby the recording performance of the thin-film magnetic head are improved.

In addition, the recording characteristics of the thin-film magnetic head can be further improved by a configuration which satisfies the relation $W \leq dTH \leq 0.7 \times PED$, where $dTH$ is a distance from the air bearing surface to the reduced part, $PED$ is a length of the second magnetic pole tip layer in the direction perpendicular to the air bearing surface, and $W$ is a track direction width of the magnetic pole tip. More specifically, distance $dTH$ indicates the distance from the air bearing surface to the end of the reduced part on the side of air bearing surface; and track direction width $W$ indicates the width in the track direction of magnetic pole part which is optically measured at the air bearing surface.

According to another embodiment of the present invention, a thin-film magnetic head fabrication method includes the steps of: forming a first yoke layer; forming a photoresist layer on the first yoke layer; forming a concavity in a portion of the first yoke layer which is enclosed by the photoresist layer; forming a nonmagnetic layer in this concavity; removing the photoresist layer; planarizing an upper surface of the nonmagnetic layer to be level with the surrounding first yoke layer; using one frame to successively form a first magnetic pole tip layer, a gap layer, and a second magnetic pole tip layer on the first yoke layer; forming a thin-film coil; and forming a second yoke layer. Though an extended part and a reduced part are formed in the first yoke layer, thus the entire form is leveled by the nonmagnetic layer, whereby the first magnetic pole tip layer, the recording gap layer, and the second magnetic pole tip layer can be accurately formed.

The steps of forming the first magnetic pole tip layer, the gap layer, and the second magnetic pole tip layer may be carried out using a plating method.

According to the present invention, in the region in which the first yoke layer confronts the first magnetic pole tip layer, an extended part having greater thickness is formed at the tip portion which is close to the air bearing surface and a reduced part having less thickness is formed in the portion which is remote from the air bearing surface. Further, only the extended part is magnetically connected to the first yoke layer, and the flow of magnetic flux is insulated in the reduced part. As a result, the leakage of magnetic flux from the first magnetic pole tip layer can be effectively prevented, and sufficient magnetic flux for writing can be supplied on the air bearing surface. In addition, planarizing the insulating layer over the reduced part such that it is level with the first yoke layer enables the accurate formation of the assemblage of the first magnetic pole tip layer, the recording gap layer, and the second magnetic pole tip layer. As a result, the present invention both enables the accurate formation of the magnetic pole part which defines the small track width and enables a still greater improvement in recording characteristics.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
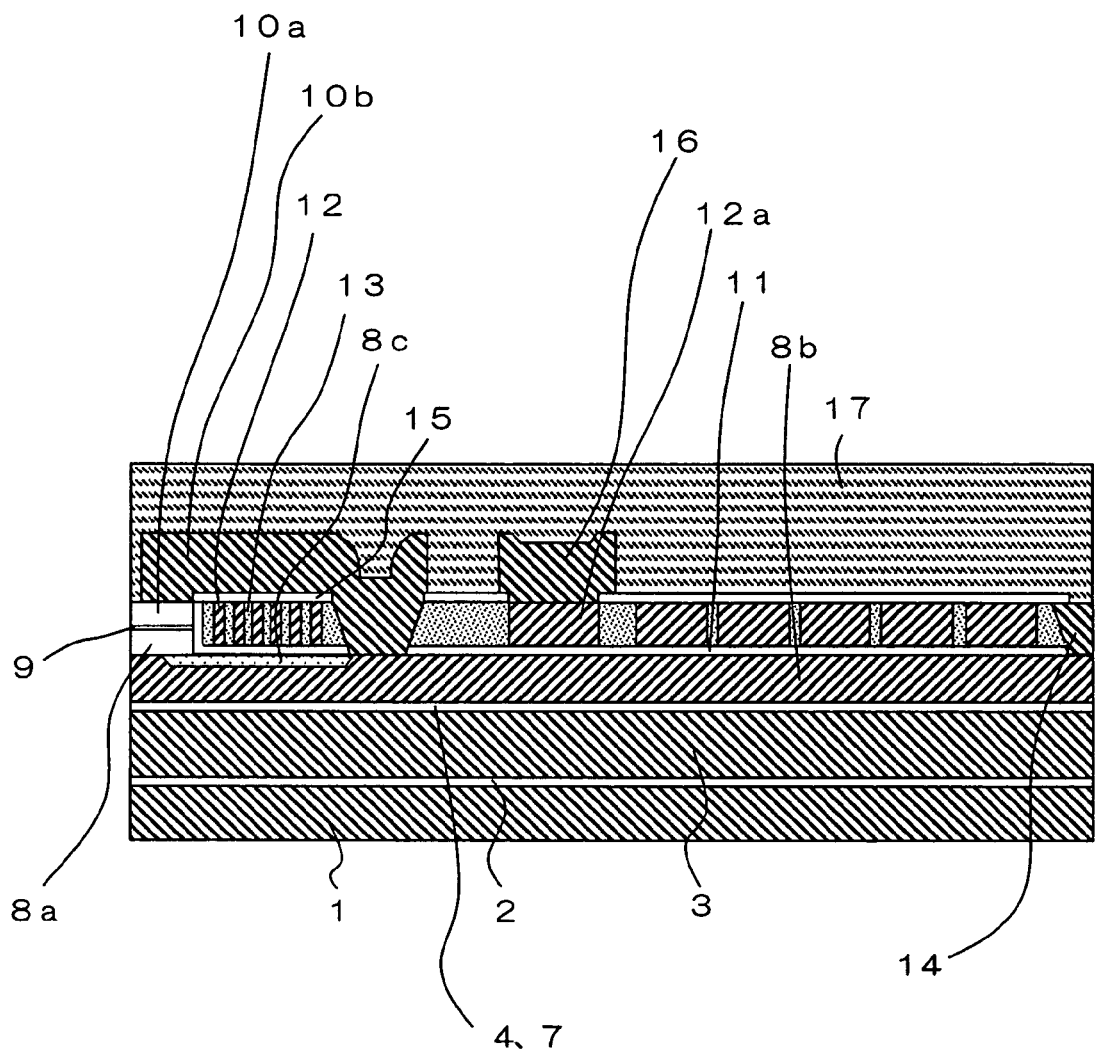
FIG. 1 is a schematic sectional view of principal parts of a thin-film magnetic head according to an embodiment of the present invention.
Figure 2A:
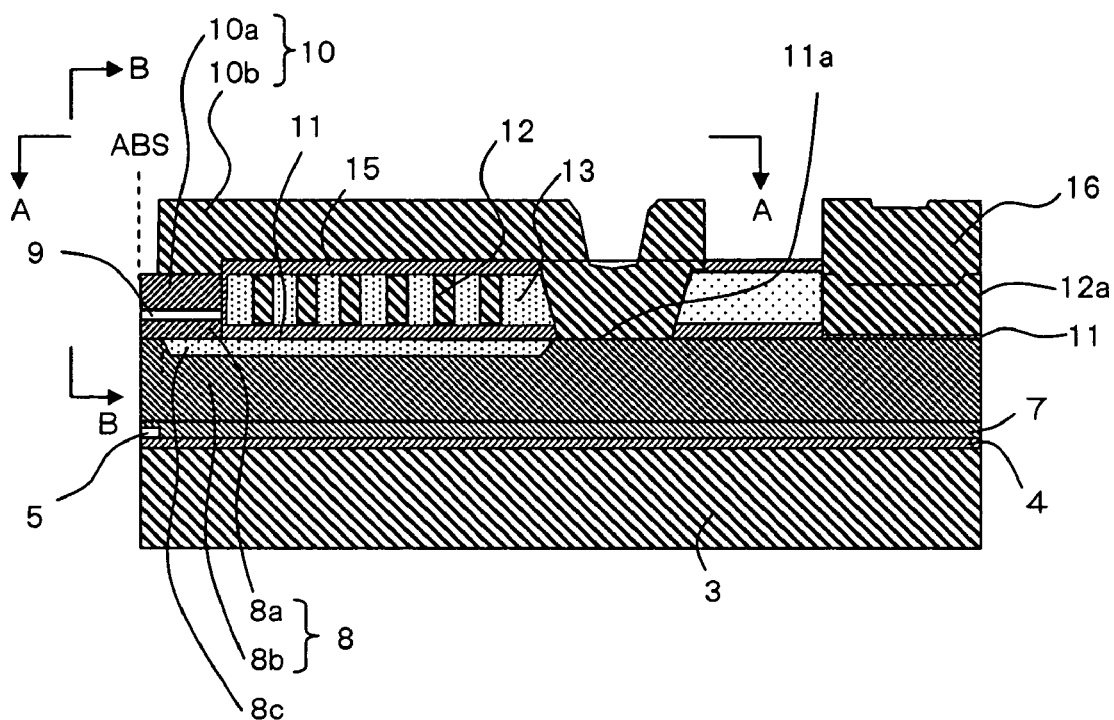
FIG. 2A is an enlarged sectional view showing the principal parts of the thin-film magnetic head as shown in FIG. 1.
Figure 2B:
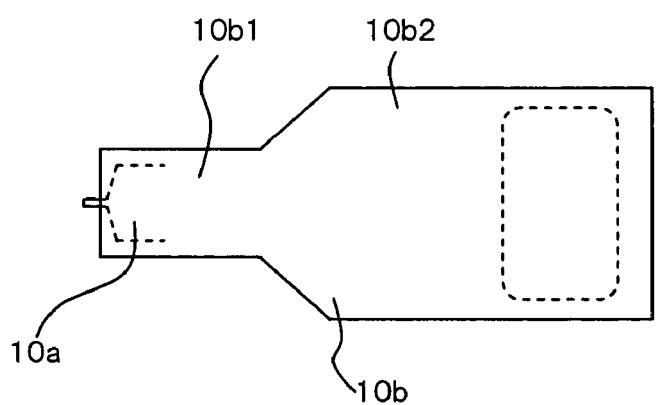
FIG. 2B is an enlarged plan view of the principal parts of the thin-film magnetic head taken along the line A-A in FIG. 2A.

Referring now to FIG. 1 and FIGS. 2A and 2B, the configuration of the thin-film magnetic head according to an embodiment of the present invention is next described. FIG. 1 is a sectional view showing the configuration of the principal parts of a thin-film magnetic head according to the present embodiment.

The air bearing surface ABS on the left side of the figure is the surface on which the thin-film magnetic head confronts the surface of a recording medium which extends in a plane perpendicular to the figure over a slight distance. FIG. 2A is an enlarged sectional view on the ABS side of the thin-film magnetic head shown in FIG. 1; and FIG. 2B shows a plan view of the upper magnetic layer taken along the line A-A in FIG. 2A.

In the thin-film magnetic head according to the present embodiment, substrate 1, insulating layer 2, lower shield layer 3, lower shield gap layer 4, upper shield gap layer 7, first yoke layer 8b, and insulating layer 11 are stacked in that order starting from below; a portion of first yoke layer 8b being replaced by nonmagnetic layer 8c. Thin-film coil 12, connector 12a, insulating layer 13, and insulating layer 14 are disposed over insulating layer 11 and nonmagnetic layer 8c; first magnetic pole tip layer 8a, recording gap layer 9, and second magnetic pole tip layer 10a are stacked on the ABS side. Second yoke layer 10b and lead layer 16 are disposed over these layers, the uppermost portion being covered by overcoat layer 17. These layers are each described in detail below.

A ceramic material such as AlTiC ($Al_2O_3 \cdot TiC$) is used for substrate 1. Insulating layer 2 which is formed on substrate 1 is composed of a material such as alumina ($Al_2O_3$). Lower shield layer 3 which is composed of a magnetic material, and lower shield gap film 4 are successively disposed over insulating layer 2. A material such as permalloy (NiFe) is used for the material of lower shield layer 3, and a material such as alumina is used for the material of lower shield gap film 4.

As shown in FIG. 2A, MR element 5 for reproducing is provided on lower shield gap layer 4 on the ABS side. One end of MR element 5 confronts air bearing surface ABS. MR element 5 is shielded by lower shield layer 3 and first yoke layer 8b which is described later. MR element 5 may employ a magnet-sensitive film which exhibits magnetoresistance such as an AMR (Anisotropic MagnetoResistance) element, a GMR (Giant MagnetoResistance) element, or a TMR (Tunnel MagnetoResistance). In addition, a pair of lead layers (not shown) is connected to MR element 5.

Upper shield gap layer 7 and first yoke layer 8b composed of a magnetic material are successively formed on lower shield gap layer 4 and MR element 5. A material such as alumina is used for the material of upper shield gap layer 7, and a magnetic material such as permalloy or CoNiFe is used for the material of first yoke layer 8b. In FIG. 1, lower shield gap layer 4 and upper shield gap layer 7 are depicted as a single layer and MR element 5 is not shown in the figure. First yoke layer 8b functions both as lower magnetic layer 8 of the recording head and as the upper shield layer of the reproducing head (MR element 5). A configuration in which these functions are separated is also possible. For example, a configuration may be used in which, instead of first yoke layer 8b, upper shield layer and yoke layer are disposed separately, an insulation being sandwiched therebetween.

A portion of the upper surface of first yoke layer 8b is cut away, the cutaway portion being replaced by nonmagnetic layer 8c. Alumina may be used for the material of nonmagnetic layer 8c. The upper surface of nonmagnetic layer 8c is planarized so as to be level with first yoke layer 8b, whereby an overall flat surface is formed. The configuration of nonmagnetic layer 8c is further described hereinbelow.

First magnetic pole tip layer 8a which is composed of a magnetic material, recording gap layer 9 which is composed of a nonmagnetic material, and second magnetic pole tip layer 10a which is composed of a magnetic material (these three layers are hereinbelow together referred to as "assemblage 30") are successively formed over first yoke layer 8b and nonmagnetic layer 8c at a position confronting the air bearing surface ABS. First magnetic pole tip layer 8a, recording gap layer 9, and second magnetic pole tip layer 10a have identical sectional profiles in parallel direction to the upper surface of substrate 1. First magnetic pole tip layer 8a and first yoke layer 8b constitute lower magnetic layer 8. A magnetic material which can be formed as a layer by means of plating, such as permalloy or CoNiFe, is used for the material of first magnetic pole tip layer 8a and second magnetic pole tip layer 10a. Preferably a material having a high saturation magnetic flux density is used for the material of first magnetic pole tip layer 8a and second magnetic pole tip layer 10a. A nonmagnetic metal material which can be formed as a layer by means of plating, such as NiP, is used for the material of recording gap layer 9.

Figure 3:
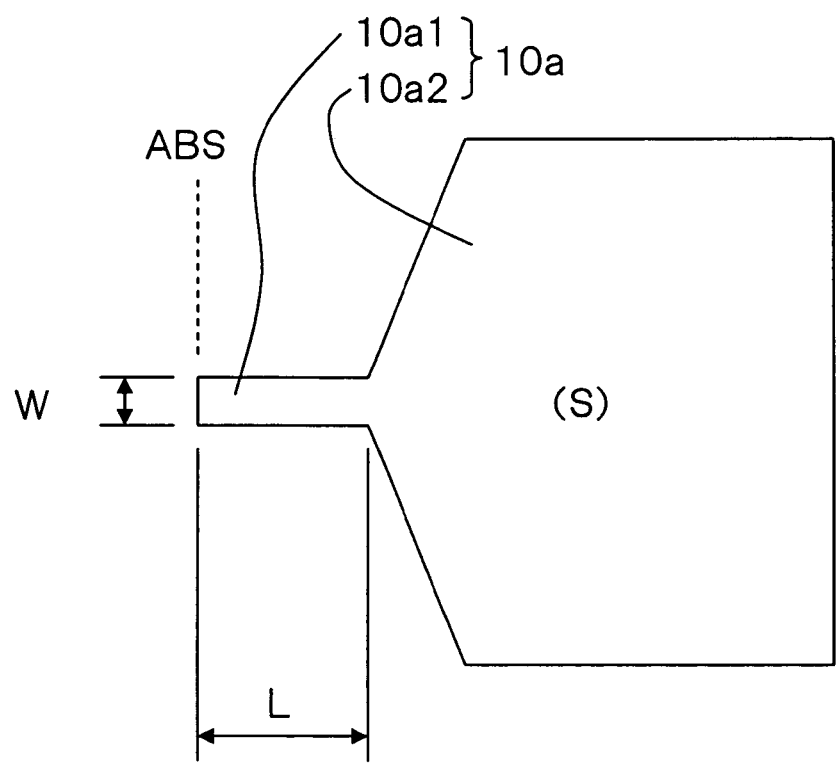
FIG. 3 is a plan view of the assemblage of the first magnetic pole tip layer, the recording gap layer, and the second magnetic pole tip layer of the thin-film magnetic head as shown in FIG. 1.
Figure 4:
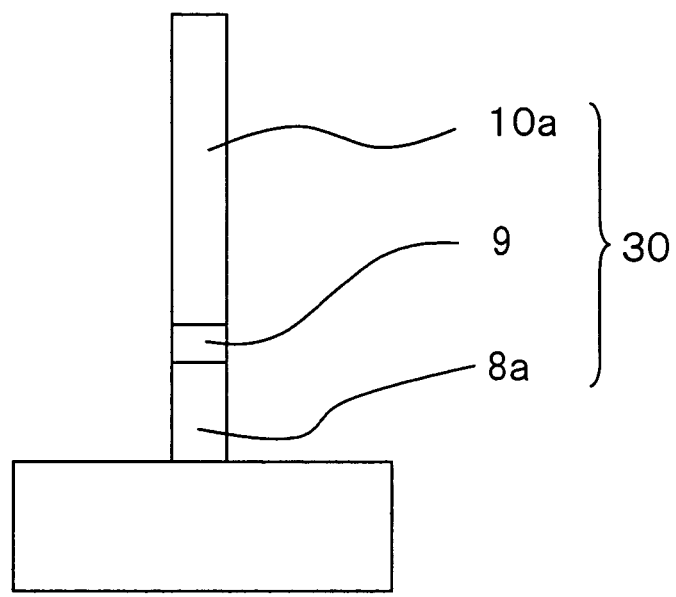
FIG. 4 is a side view of the assemblage as shown in FIG. 3.

Referring now to FIGS. 3 and 4, the configuration of assemblage 30 in the present embodiment is next described in detail. FIG. 3 is a plan view of assemblage 30, and FIG. 4 is a side view of assemblage 30 seen from the ABS side(the direction of B-B in FIG. 2A). Second magnetic pole tip layer 10a is described using FIG. 3 as an example, but the same description applies equally to recording gap layer 9 and first magnetic pole tip layer 8a.

Second magnetic pole tip layer 10a includes: a first part 10a1 which is formed on the ABS side, having a track-direction width W at the magnetic pole tip which defines the optical track width of the recording medium; and second part 10a2 which is connected to first part 10a1 at a remote point from the ABS, having a width greater than that of first part 10a1.

In the present embodiment, the ratio L/W is between 2 and 5, where L is the distance from air bearing surface ABS to the connection of first part 10a1 and second part 10a2. In addition, the ratio S/(W×L) is between 5 and 40, where S is the area of the section of the second magnetic pole tip layer 10a measured in parallel direction to the upper surface of substrate 1.

Insulating layer 11 is disposed on first yoke layer 8b at a remote position from the ABS. Thin-film coil 12 is formed on insulating layer 11 and has a plurality of turns in a spiral fashion around contact hole 11a which is described later. A portion of thin-film coil 12 forms connector 12a which is connected to lead layer 16 which is explained later. Contact hole 11a which connects first yoke layer 8b and second yoke layer 10b is formed on insulating layer 11 in the central part of thin-film coil 12. A material such as alumina is used for the material of insulating layer 11. A conductive material such as copper is used for the material of thin-film coil 12.

Insulating layer 13 fills the each space between the adjacent winds of thin-film coil 12 and the space facing the inside end and the outside end of thin-film coil 12; insulating layer 14 is formed around assemblage 30 and insulating layer 13; and insulating layer 15 covers the upper surface of thin-film coil 12. Assemblage 30 is thus insulated from thin-film coil 12. A material such as photoresist is used for the material of insulating layer 13, and a material such as alumina is used for the material of insulating layers 14 and 15.

Second yoke layer 10b which is composed of a magnetic material is formed over second magnetic pole tip layer 10a and insulating layer 15. Second yoke layer 10b, together with second magnetic pole tip layer 10a, forms upper magnetic layer 10. As shown in FIG. 2B, second yoke layer 10b includes: first part 10b1 which has a small width on the ABS side, and second part 10b2 which has a width greater than that of first part 10b1, being connected to first part 10b1. The end of first part 10b1 on the ABS side is positioned between the connection of first part 10a1 and second part 10a2 in second magnetic pole tip layer 10a and the air bearing surface ABS. The width of second part 10b2 is equal to the width of first part 10b1 at the connection with first part 10b1, gradually increases with distance from first part 10b1 increasing, and then reaches a fixed width.

The end of second yoke layer 10b on the ABS side is in contact with the upper surface of second magnetic pole tip layer 10a, being arranged with a gap from the air bearing surface ABS. Second yoke layer 10b is connected to first yoke layer 8b by contact hole 11a. As a result, upper magnetic layer 10 and lower magnetic layer 8 together form a U-shaped conductor, thin-film coil 12 being wound around the conductor to form one electromagnet. A magnetic material which can be formed as a layer, such as permalloy or CoNiFe, is used for the material of second yoke layer 10b.

Lead layer 16 is connected to connector 12a of thin-film coil 12. Lead layer 16 is formed from a conductive material. The material of lead layer 16 may be the same as the material for second yoke layer 10b.

Finally, overcoat layer 17 which is composed of an insulative material is formed so as to cover second yoke layer 10b, insulating layer 14, and insulating layer 15. Alumina may be used for the material of overcoat layer 17.

The configuration of nonmagnetic layer 8c, which is a key feature of the present embodiment is next described in detail.

Figure 5:
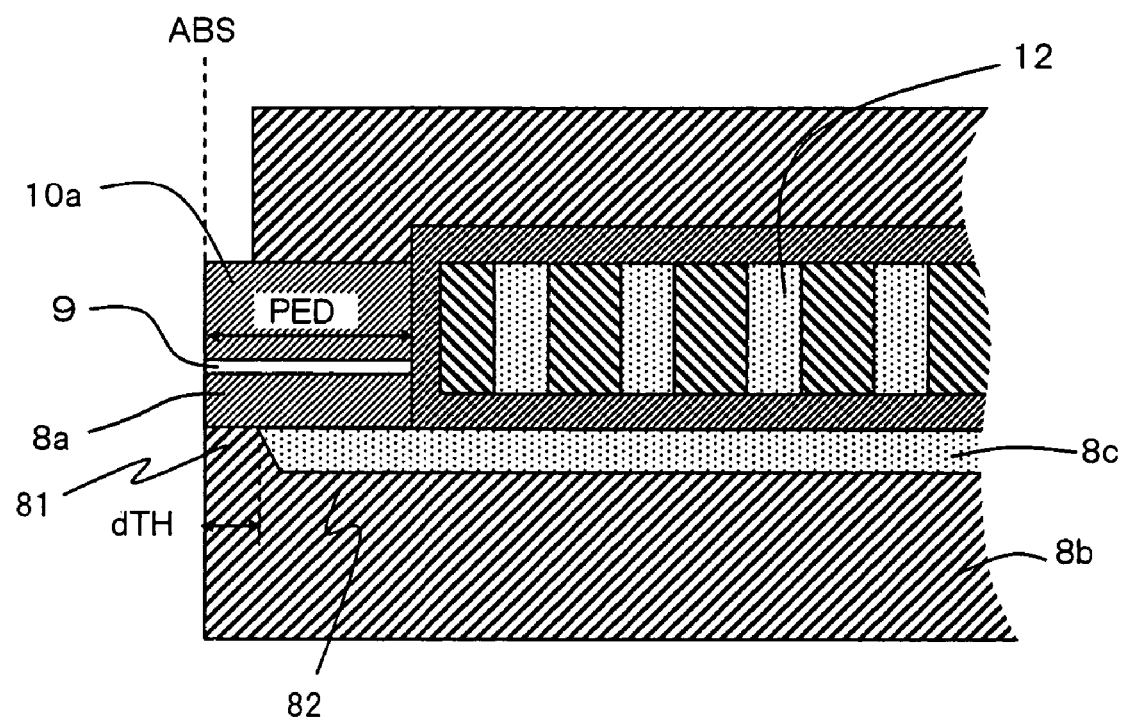
FIG. 5 is an enlarged sectional view of the vicinity of the assemblage as shown in FIG. 3.

FIG. 5 is an enlarged view of the vicinity of nonmagnetic layer 8c. Nonmagnetic layer 8c is formed such that it replaces a portion of the upper surface of first yoke layer 8b and has a trapezoidal sectional profile in which the upper surface extends longer than the base surface. The end of nonmagnetic layer 8c on the ABS side is below first magnetic pole tip layer 8a. Thus, in the region in which first yoke layer 8b confronts first magnetic pole tip layer 8a, first yoke layer 8b has extended part 81 having relatively greater thickness on the ABS side and has reduced part 82 having a relatively smaller thickness in the portion remote from the ABS; whereby first magnetic pole tip layer 8a is connected to first yoke layer 8b by extended part 81 and reduced part 82 is magnetically isolated by nonmagnetic layer 8c. In the following description, dTH means the distance from air bearing surface ABS to nonmagnetic layer 8c, i.e., to the reduced part 82. Since the effect exists, as will be explained later, that the length of recording gap layer 9 in the direction perpendicular to the air bearing surface ABS or the throat height is reduced by the existence of nonmagnetic layer 8c, dTH may be referred to as the pseudo-throat height. PED means the length of second magnetic pole tip layer 10a in the direction perpendicular to the air bearing surface ABS. As previously described, W is the width in the track-direction of magnetic pole part.

In the thin-film magnetic head, magnetic field is generated in thin-film coil 12 according to the information which is to be recorded on the recording medium. Then lower magnetic layer 8 and upper magnetic layer 10 transmit magnetic flux which corresponds to the magnetic field generated by thin-film coil 12. Then, at the air bearing surface ABS, first magnetic pole tip layer 8a and second magnetic pole tip layer 10a generate magnetic field for recording information on the recording medium. Accordingly, the flow of magnetic flux must be controlled appropriately (choking control) such that magnetic flux is efficiently generated at the end of recording gap layer 9 on the ABS side, resulting in improvement in recording performance. To achieve this control, distance dTH is preferably set to satisfy the dimensional condition given by the following formula:

$$W \leq dTH \leq 0.7 \times PED \quad (1)$$

Figures 6A, 6B:
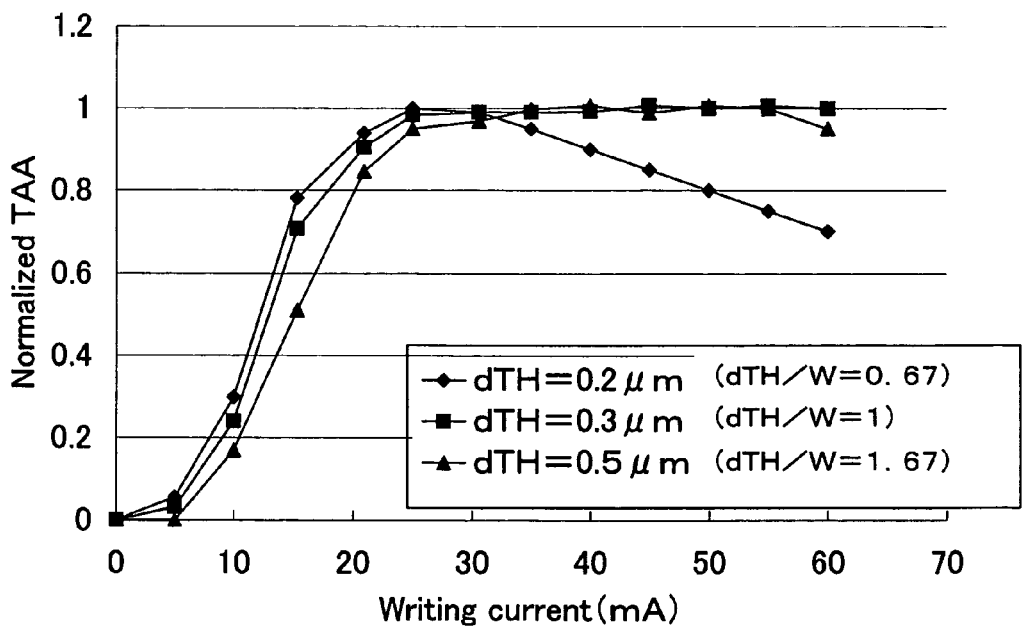
FIGS. 6A and 6B are explanatory views of the recording performance of a thin-film magnetic head according to an embodiment of the present invention.

Referring to FIGS. 6A to 8B, the basis for formula (1) is described. FIGS. 6A and 6B present the results of experimentation which give the basis for W≦dTH of formula (1), FIG. 6A showing the experimental data as a table, and FIG. 6B showing this data in the form of a graph. FIGS. 6A and 6B show the relation between a writing current and a normalized TAA, which is the reproducing output, with a parameter dTH. The higher the obtained reproducing output at a fixed writing current is, or the smaller the writing current for obtaining a fixed reproducing output is, the higher the writing performance is, thus the relation between the writing current and TAA is an index of writing capability. Normalization means that a particular value in the results is set to 1 for data processing reason. In the experimentation, the change in TAA was evaluated on the condition that the track-direction width W was fixed to 0.3 μm, PED fixed to 2.5 μm, while dTH was varied from 0.2 μm, to 0.3 μm, and to 0.5 μm.

As can be seen from FIGS. 6A and 6B, when dTH was 0.3 μm and 0.5 μm, the normalized TAA was gradually saturated as the writing current increased, and the saturated state was maintained despite increase in the writing current. When dTH was 0.2 μm, the normalized TAA, i.e., the writing performance, was degraded on the contrary even when the writing current was too great. The reason of this phenomena is thought that the magnetic poles become oversaturated when distance dTH is too small. A magnetic head having these characteristics is therefore difficult to use when installed in a hard disk device. The figures shown in the row of "25/60" in FIG. 6A indicate the reproducing output ratio (TAA (25)/TAA(60) at writing currents of 25 mA and 60 mA, and is an index indicating the saturatability at low currents. In general, the reproducing output at 25 mA is preferably more than 70% of the reproducing output when saturated (60 mA). Since the ratio when dTH is 0.3 μm and 0.5 μm shows substantially "1", no problems are caused. Based on these results, dTH should be greater than or equal to track-direction width W, and this condition defines the minimum value of dTH.

Figures 7A, 7B:
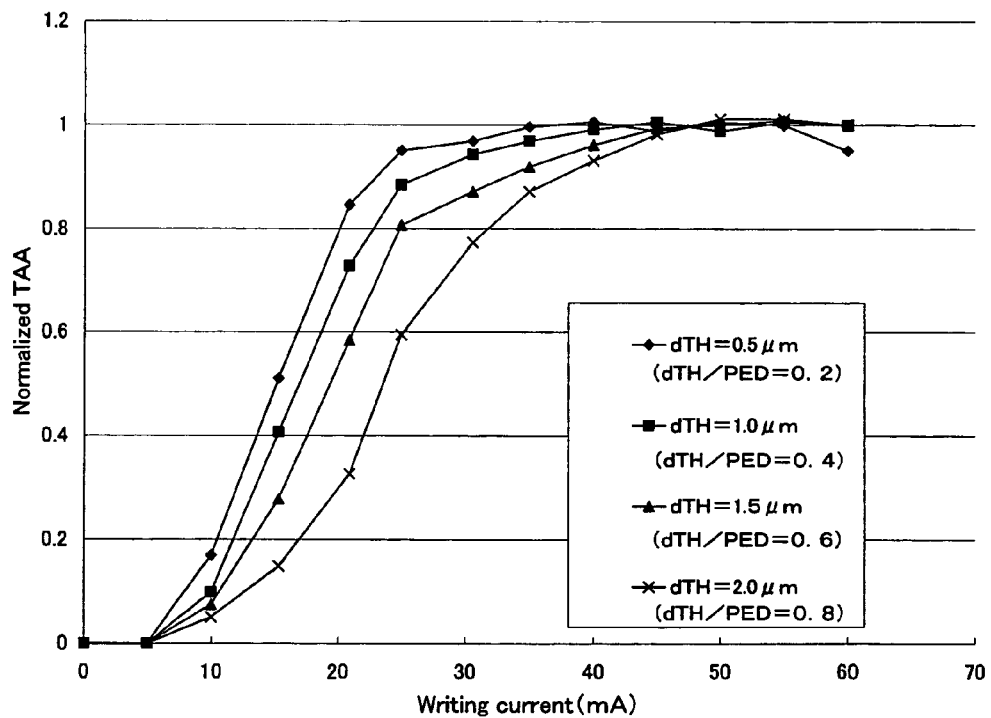
FIGS. 7A and 7B are explanatory views of the recording performance of a thin-film magnetic head according to an embodiment of the present invention.

FIGS. 7A and 7B present the experimental results which indicate the basis for dTH≦0.7×PED in formula (1), FIG. 7A showing the experimental data in the form of a table, and FIG. 7B showing the data in the form of a graph. The meaning of normalized TAA is the same as in FIGS. 6A and 6B. In order to define the maximum value of dTH, experiments were carried out for four cases in which the above-described dTH was varied in 0.5 μm increments from 0.5 μm to 2.0 μm. The conditions for track direction width W and PED were the same as in the experiments shown in FIGS. 6A and 6B.

As can be seen from FIGS. 7A and 7B, the saturation characteristic gradually deteriorates as dTH increases, and sufficient writing characteristics cannot be obtained despite increase of the writing current. This phenomenon occurs because the generated magnetic flux leaks to the vicinity as dTH increases, and the magnetic flux which reaches the air bearing surface ABS is therefore reduced.

Figures 8A, 8B:
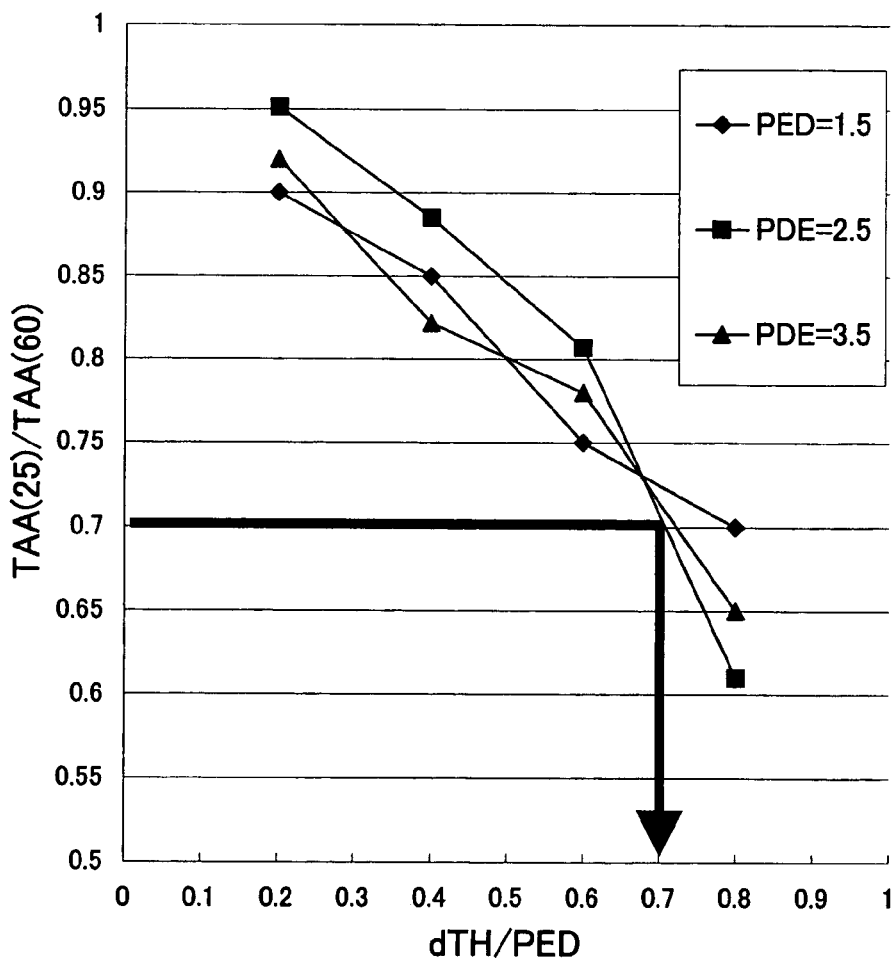
FIGS. 8A and 8B are explanatory views of the recording performance of a thin-film magnetic head according to an embodiment of the present invention.

Additional experimentations were carried out to define the maximum value of dTH based on the above-described criteria of TAA (25) to TAA (60). These experiments were carried out for cases in which dTH/PED was varied from 0.2 to 0.8 (corresponding to a variation of dTH from 0.5 μm to 2.0 μm), and PED was varied from 1.5, to 2.5 and 3.5. FIG. 8A shows the experimental data as a table, and FIG. 8B shows these data in the form of a graph. From this table and graph, it can be understood that the value of dTH/PED which can satisfy the criteria of 0.7 of TAA (25)/TAA (60) is generally 0.7 or less in the range in which parameter PED was enveloped. In other words, dTH should be limited to a range which does not exceed 0.7 times the PED, this being the condition which defines the maximum value of dTH.

As previously described, a portion of first yoke layer 8b below first magnetic pole tip layer 8a is replaced by non-magnetic layer 8c, whereby the throat height is substantially reduced from PED to dTH and the leakage of magnetic flux to the surrounding regions can be effectively prevented. In this way, a good reproducing output can be obtained with smaller writing current, thus an improvement in writing capabilities can be achieved.

Figures 9A, 9B:
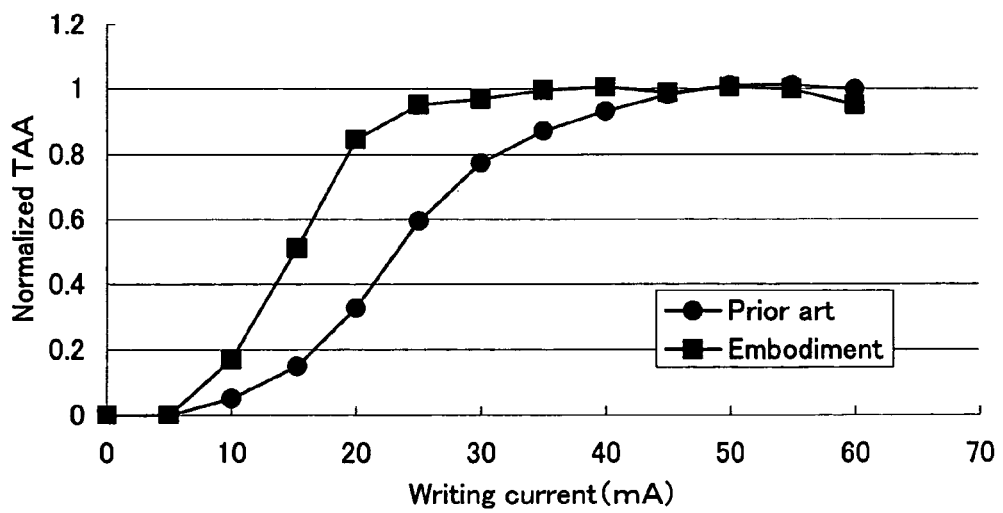
FIGS. 9A and 9B are explanatory views of the recording performance of a thin-film magnetic head according to an embodiment of the present invention.

FIGS. 9A and 9B show the results of comparing the writing capabilities of a thin-film magnetic head according to the present embodiment with that of a thin-film magnetic head of the prior art which does not have nonmagnetic layer 8c. FIG. 9A shows the experimental data in a table, and FIG. 9B shows these data in the form of a graph. The track direction width W was set to 0.3 μm, dTH to 0.5 μm, and PED to 2.5 μm. Comparing with an example of the prior art, it can be seen that the saturation characteristic versus writing current was remarkably improved, a sufficient reproducing output being obtained at even a small current.

Referring now to FIGS. 10 to 18, a method of fabricating the thin-film magnetic head according to the present embodiment is next described. Although a method of fabricating a single thin-film magnetic head is described here, in actuality, a plurality of thin-film magnetic heads are simultaneously fabricated using a single wafer (substrate) in the present embodiment.

Figure 10:
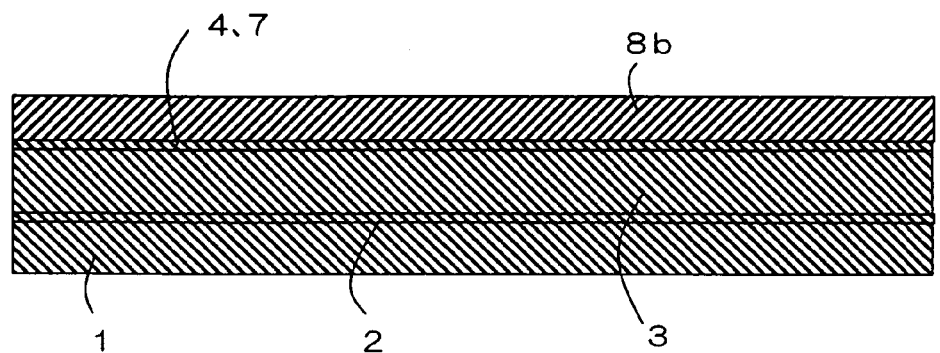
FIG. 10 is a view of a fabrication step of the thin-film magnetic head as shown in FIG. 1.

In the method of fabricating a thin-film magnetic head according to the present embodiment, insulating layer 2 is first formed on substrate 1 by, for example, a sputtering method, as shown in FIG. 10. Lower shield layer 3 is next formed on insulating layer 2 by, for example, a sputtering method or a plating method.

Lower shield gap film 4 is next formed on lower shield layer 3 by, for example, a sputtering method. MR element 5 (not shown) is next formed on lower shield gap film 4 by, for example, a sputtering method. A pair of lead layers (not shown) which is electrically connected to MR element 5 is next formed on lower shield gap film 4 by, for example, a sputtering method. Next, upper shield gap layer 7 is formed by, for example, a sputtering method on lower shield gap film 4, MR element 5, and the lead layers. Each of the layers which form the above-described reproducing head is patterned by a typical lift-off method using a patterned resist layer or etching method or a combination of these methods.

First yoke layer 8b is next formed on upper shield gap layer 7 by, for example, a sputtering method or plating method.

Figure 11A:
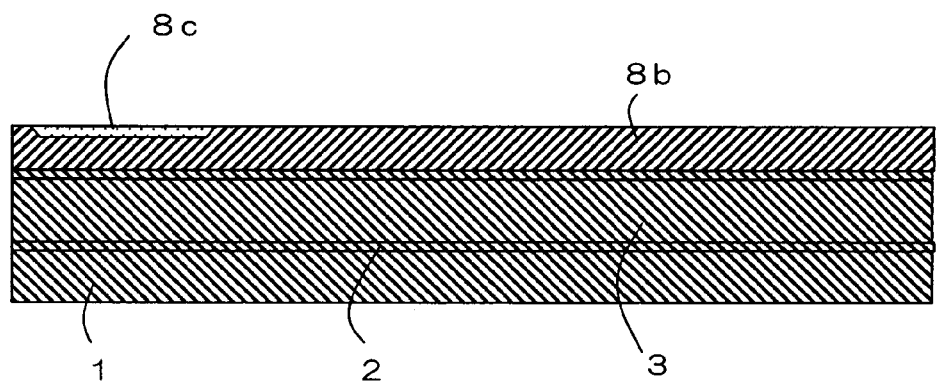
FIG. 11A is a view of a fabrication step of the thin-film magnetic head as shown in FIG. 1.
Figure 11B:
FIGS. 11B-11F are views of the fabrication steps of the insulating layer of the thin-film magnetic head as shown in FIG. 1.
Figure 11C:
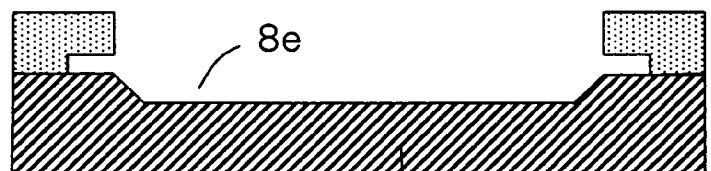
Figure 11D:
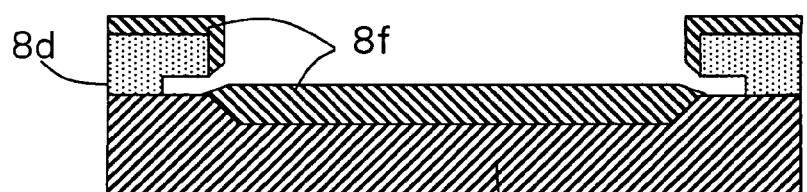
Figure 11E:
Figure 11F:
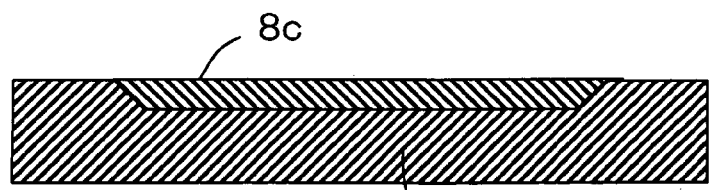

A portion of first yoke layer 8b is next replaced by nonmagnetic layer 8c. FIG. 11A shows the completed state of this replacement, and FIGS. 11B-11F show the method for forming the nonmagnetic layer. The method of forming nonmagnetic layer 8c is next described using FIGS. 11B-11F. First, as shown in FIG. 1B, photoresist layer 8d is formed at the position at which nonmagnetic layer 8c of first yoke layer 8b is to be formed. Next, concavity 8e having a trapezoidal sectional profile is formed in first yoke layer 8b by means of an ion milling method as shown in FIG. 1C. Alumina is then deposited over concavity 8e to form alumina layer 8f as shown in FIG. 11D. At this time, alumina layer 8f is deposited with enough excess to cause alumina layer 8f to bulge above the surrounding plane of first yoke layer 8b, alumina layer 8f being similarly formed on surrounding photoresist layer 8d. Photoresist layer 8d is next removed together with alumina layer 8f which was deposited on the periphery by means of a lift-off method, as shown in FIG. 1E. Finally, alumina layer 8f is lapped by chemical-mechanical polishing (CMP) to form nonmagnetic layer 8c having a planar surface which is level with the surface of surrounding first yoke layer 8b, as shown in FIG. 11F.

Figure 12:
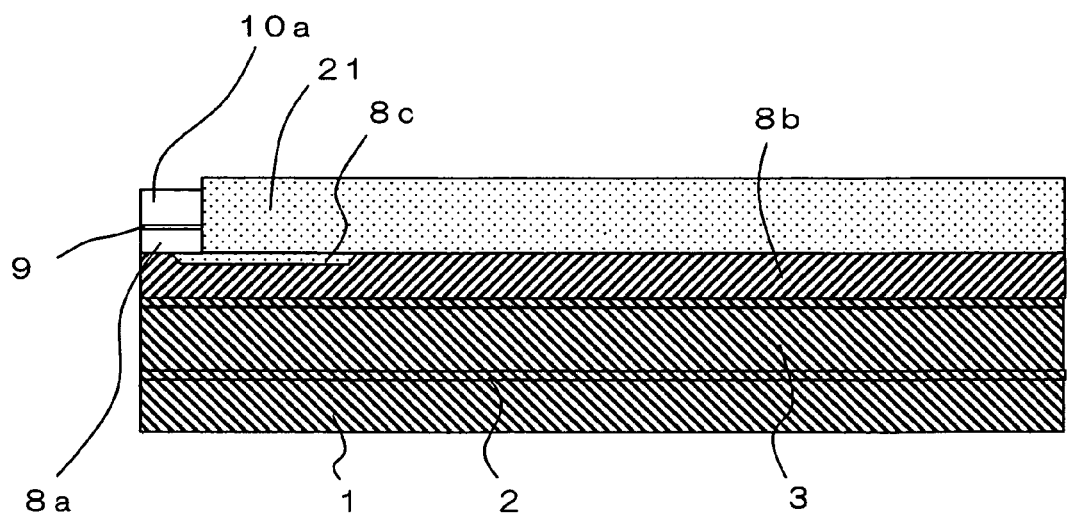
FIG. 12 is a view of a fabrication step of the thin-film magnetic head as shown in FIG. 1.

An electrode film for plating (not shown) is next formed by means of, for example, a sputtering method, on first yoke layer 8b and nonmagnetic layer 8c. Next, as shown in FIG. 12, a photoresist layer is formed on the above-described electrode film, and the photoresist layer is patterned by means of photolithography to form frame 21. Frame 21 has an opening at the position at which first magnetic pole tip layer 8a, recording gap layer 9, and second magnetic pole tip layer 10a are to be formed.

Next, magnetic pole tip layer 8a, recording gap layer 9, and second magnetic pole tip layer 10a are successively formed by means of a frame plating method using frame 21. The material for first magnetic pole tip layer 8a and second magnetic pole tip layer 10a is a magnetic material which can be formed as a layer by a plating method, and the material for recording gap layer 9 is a nonmagnetic material which can be formed as a layer by a plating method.

Frame 21 is next removed, and the portions of the electrode film for plating other than the portion which underlies first magnetic pole tip layer 8a are also removed by etching.

Figure 13:
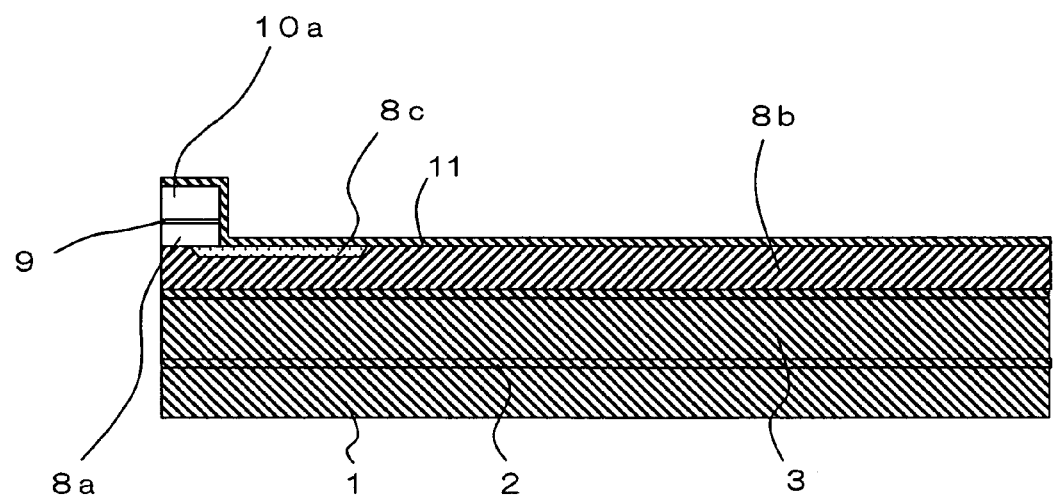
FIG. 13 is a view of a fabrication step of the thin-film magnetic head as shown in FIG. 1.

Next, as shown in FIG. 13, insulating layer 11 is formed by, for example, a sputtering method over the entire upper surface of the deposited layers which are formed up to this step. Insulating layer 11 is also formed on the side walls of the assemblage of first magnetic pole tip layer 8a, recording gap layer 9, and second magnetic pole tip layer 10a.

Figure 14:
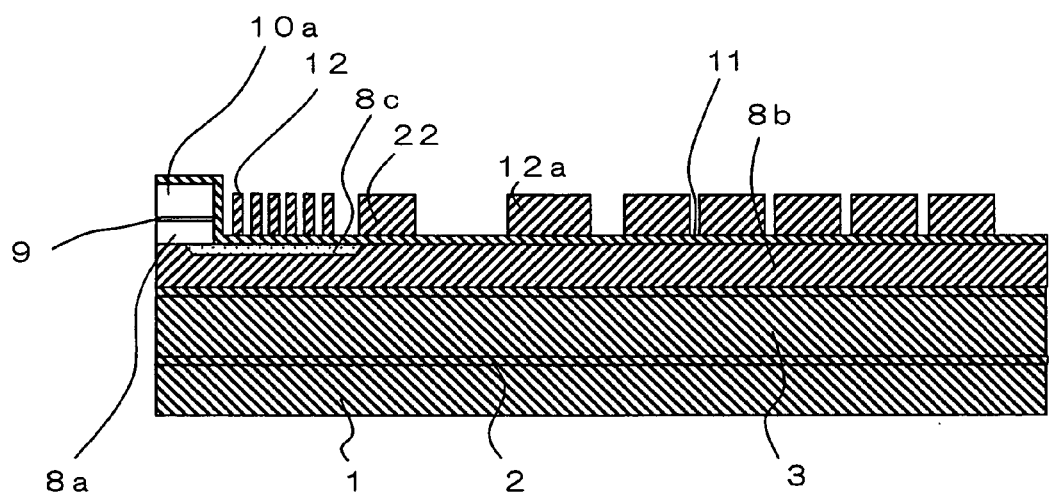
FIG. 14 is a view of a fabrication step of the thin-film magnetic head as shown in FIG. 1.

Thin-film coil 12 is next formed by means of, for example, a frame plating method on insulating layer 11 as shown in FIG. 14. At this time, dummy layer 22 is simultaneously formed on insulating layer 11 at the position where first yoke layer 8b and second yoke layer 10b are to be connected.

Figure 15:
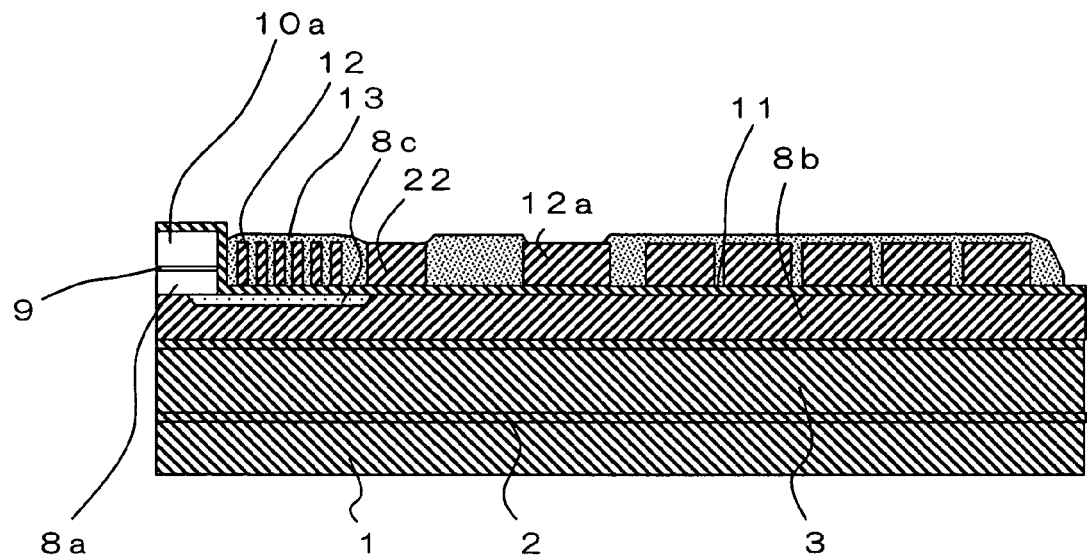
FIG. 15 is a view of a fabrication step of the thin-film magnetic head as shown in FIG. 1.

Insulating layer 13 is next formed so as to cover thin-film coil 12 as shown in FIG. 15. Insulating layer 14 is next formed so as to cover the entire deposited layers. The thickness of insulating layer 14 is equal to or greater than that of thin-film coil 12.

Figure 16:
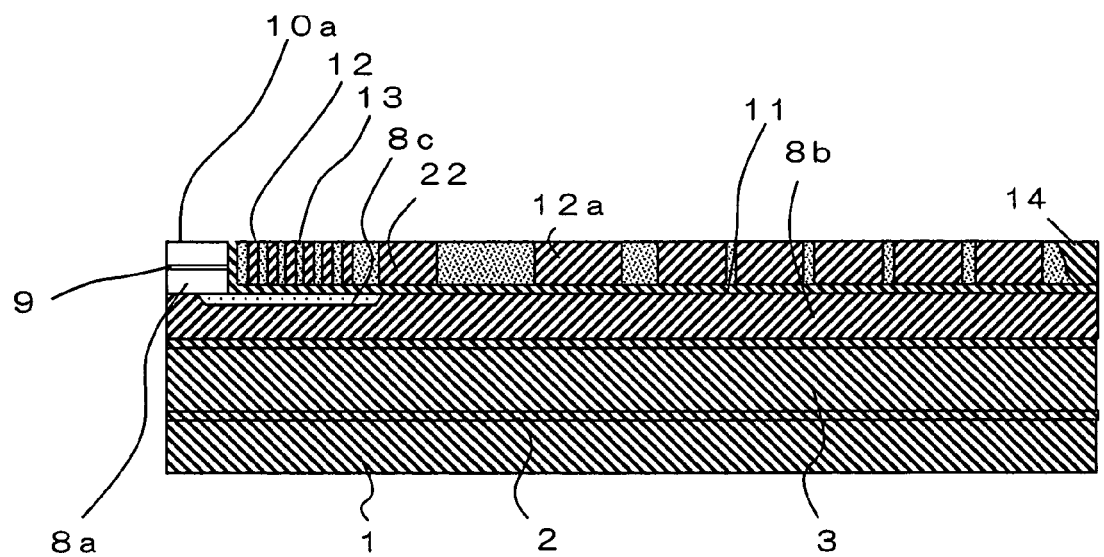
FIG. 16 is a view of a fabrication step of the thin-film magnetic head as shown in FIG. 1.

Insulating layer 14 is then lapped by a chemical-mechanical polishing until thin-film coil 12 and dummy layer 22 are exposed as shown in FIG. 16.

Figure 17:
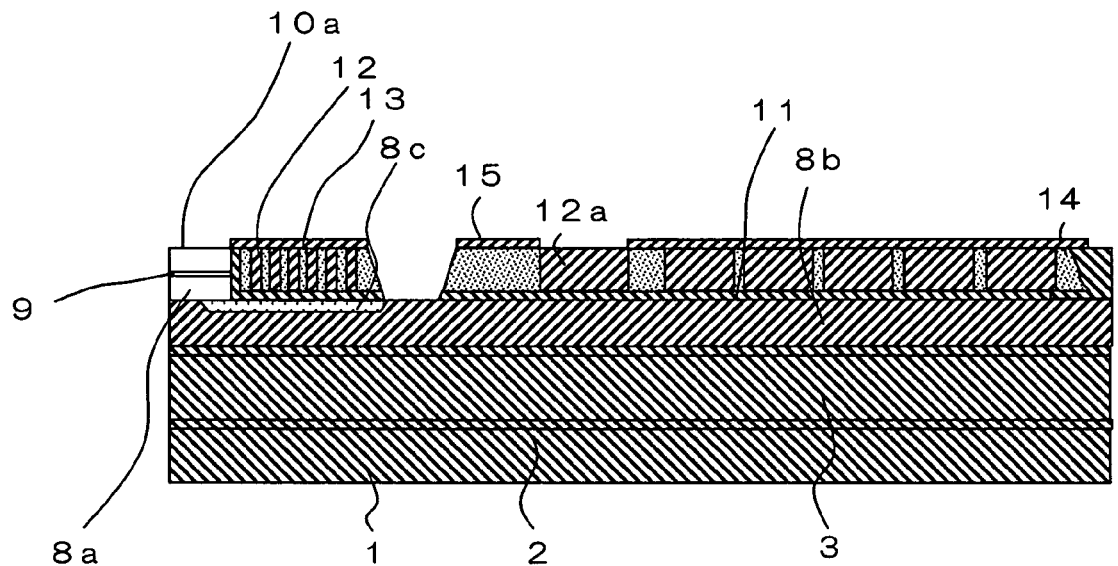
FIG. 17 is a view of a fabrication step of the thin-film magnetic head as shown in FIG. 1.

Next, as shown in FIG. 17, insulating layer 15 is formed over the entire upper surface of the deposited layers. The portions of insulating layer 15 which overlie second magnetic pole tip layer 10a, dummy layer 22, and the connector of thin-film coil 12 are selectively etched. Dummy layer 22 and insulating layer 11 which underlies dummy layer 22 are further removed by selective etching.

Figure 18:
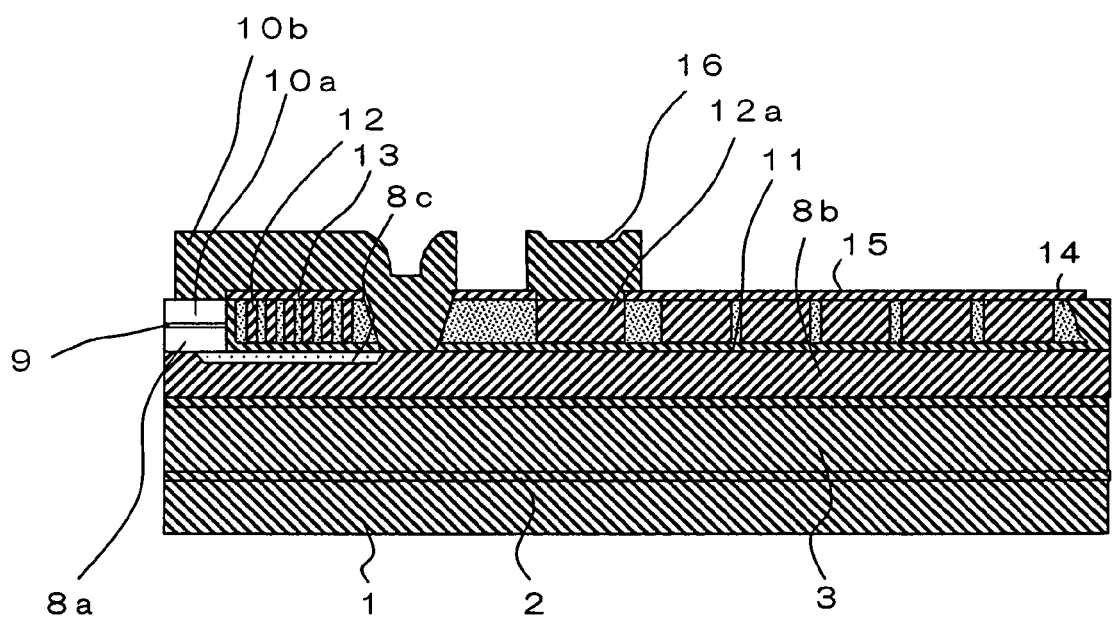
FIG. 18 is a view of a fabrication step of the thin-film magnetic head as shown in FIG. 1.

Second yoke layer 10b and lead layer 16 are next formed by, for example, a frame plating method as shown in FIG. 18. Finally, overcoat layer 17 is formed by, for example, a sputtering method so as to cover the deposited layers. A slider which includes the above-described layers is then processed, the air bearing surface ABS of the thin-film magnetic head which includes a recording head and a reproducing head is formed, and the thin-film magnetic head is completed. This state is as shown in FIG. 1.

In the present embodiment, first magnetic pole tip layer 8a, recording gap layer 9, and second magnetic pole tip layer 10a have the same sectional profiles in a direction parallel to the upper surface of substrate 1. In addition, first magnetic pole tip layer 8a, recording gap layer 9, and second magnetic pole tip layer 10a are formed by a plating method on a planar surface of first yoke layer 8b and nonmagnetic layer 8c through the use of one frame 21. Thus, in the present embodiment, the magnetic pole width can be controlled by means of photolithography, and moreover, frame 21 which defines the magnetic pole width is formed on a planar surface. The present embodiment therefore enables the accurate formation of the magnetic pole which form a small tracking width of 0.3 μm or less, and further, enables suppression of variation in the magnetic pole width in a plurality of thin-film magnetic heads which are fabricated using a single wafer.

As described in the foregoing description, the present embodiment both enables the accurate formation of the magnetic pole tip which defines the small recording track width and allows an improvement in the recording characteristics.

Figure 19:
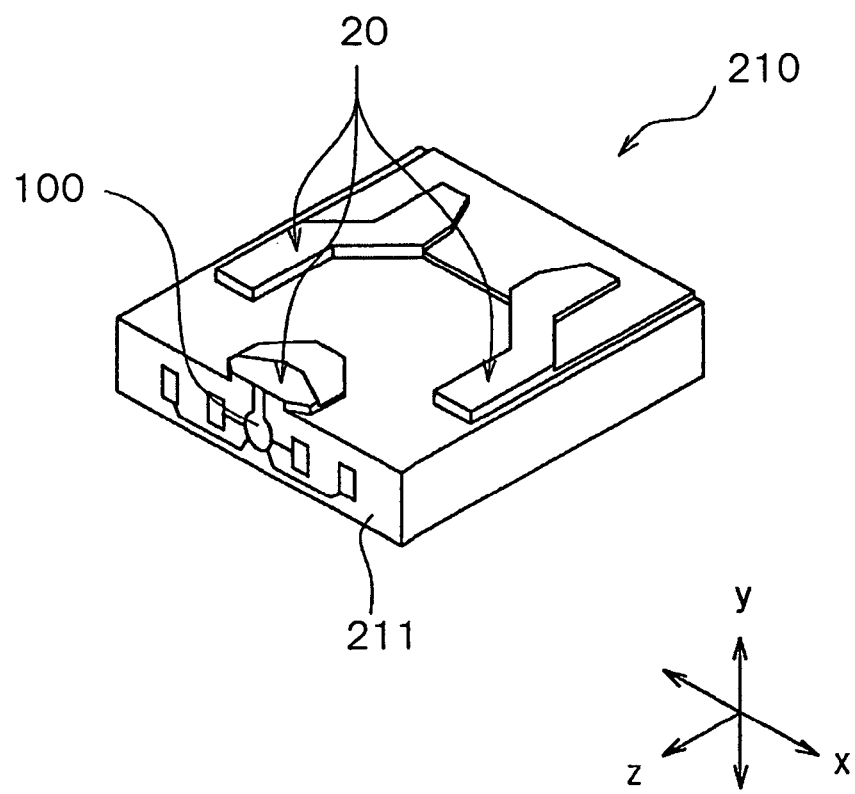
FIG. 19 is a perspective view showing a slider which is included in the head gimbal assembly according to an embodiment of the present invention.

The following description regards the head gimbal assembly and hard disk device according to the present embodiment. Referring first to FIG. 19, slider 210 which is included in the head gimbal assembly is next explained. In a hard disk device, slider 210 is arranged to confront the hard disk, which is a rotationally driven disk-shaped recording medium. Slider 210 is provided with base 211 which is mainly composed of substrate 1 and overcoat layer 17 as shown in FIG. 1. Base 211 has a substantially hexahedral shape. One of the six surfaces of base 211 confronts the hard disk. Air bearing surface 20 is formed on this surface. When the hard disk rotates in the z direction in FIG. 19, the air current which passes between the hard disk and slider 210 produces lift against slider 210 in the downward y direction in FIG. 19. This lift causes slider 210 to rise from the surface of the hard disk. The x direction in FIG. 19 is the direction transverse to the track of the hard disk. Thin-film magnetic head 100 according to the present embodiment is formed adjacent to the end of slider 210 from which the air current is expelled (the lower left end in FIG. 19).

Figure 20:
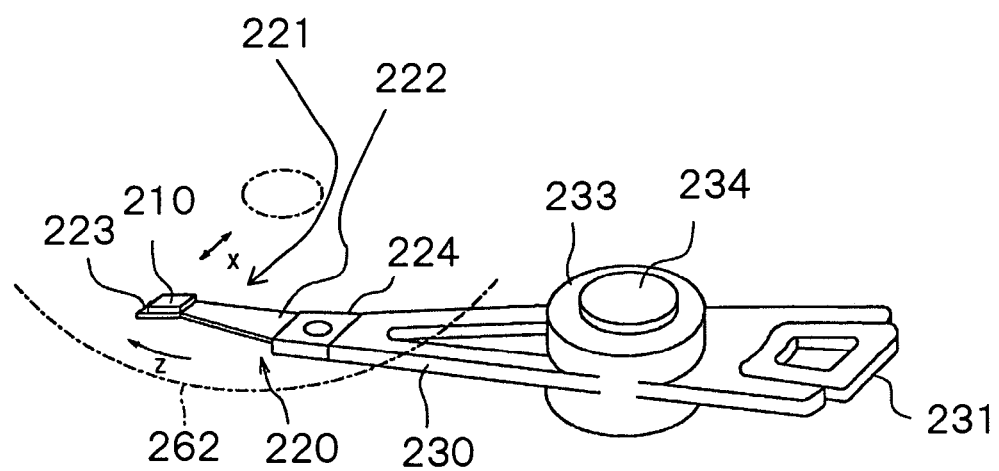
FIG. 20 is a perspective view showing a head arm assembly which includes a head gimbal assembly according to an embodiment of the present invention.

Referring next to FIG. 20, the following description regards head gimbal assembly 220 according to the present embodiment. Head gimbal assembly 220 is provided with slider 210, and suspension 221 which elastically supports slider 210. Suspension 221 includes: load beam 222 of leaf spring form which is formed from, for example, stainless steel; flexure 223 which is provided at one end of load beam 222 and supports slider 210 such that it gives slider 210 appropriate freedom of movement; and base plate 224 which is provided on the other end of load beam 222. Base plate 224 is attached to arm 230 of an actuator for moving slider 210 in the direction×transverse to the track of hard disk 262. The actuator includes arm 230 and a voice coil motor for driving arm 230. A gimbal for holding slider 210 in a uniform attitude is provided in the portion of flexure 223 to which slider 210 is attached.

Head gimbal assembly 220 is attached to arm 230 of the actuator. The unit in which head gimbal assembly 220 is attached to one arm 230 is referred to as a "head arm assembly." The unit in which head gimbal assembly 220 is attached to each arm of a carriage having a plurality of arms is referred to as a "head stack assembly."

FIG. 20 shows an example of a head arm assembly. In this head arm assembly, head gimbal assembly 220 is attached to one end of arm 230. A coil 231 which is a part of a voice coil motor is attached to the other end of arm 230. At the middle portion of arm 230 is provided bearings 233 which is installed to shaft 234 for freely and rotatably supporting arm 230.

Figure 21:
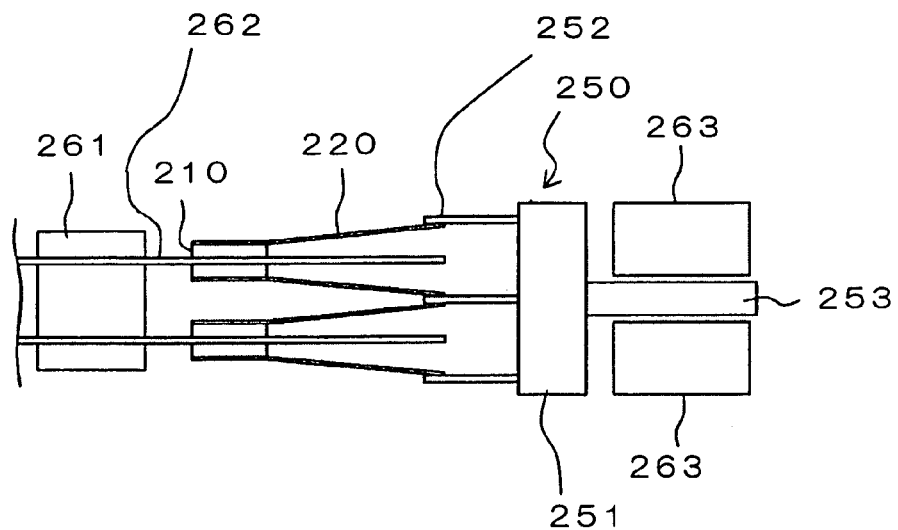
FIG. 21 is an explanatory view showing principal parts of a hard disk device according to an embodiment of the present invention.
Figure 22:
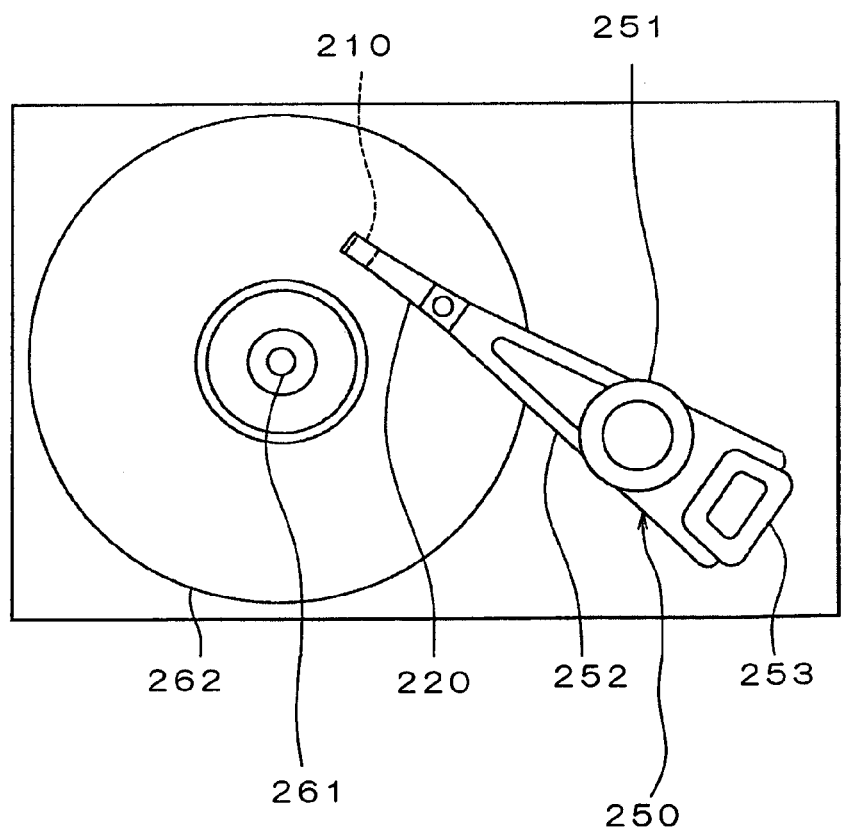
FIG. 22 is a plan view of the hard disk device according to an embodiment of the present invention.

Referring now to FIGS. 21 and 22, the following description regards an example of the head stack assembly and the hard disk device according to the present embodiment. FIG. 21 is an explanatory view showing the principal parts of a hard disk device, and FIG. 22 is a plan view of the hard disk device. Head stack assembly 250 has carriage 251 which has a plurality of arms 252. Head gimbal assemblies 220 is installed on each of the plurality of arms 252 such that the head gimbal assemblies are aligned in the perpendicular direction with a space provided between each of the assemblies. Coil 253, which is one part of a voice coil motor, is attached to the opposite side of arms 252 in carriage 251. Head stack assembly 250 is incorporated within a hard disk device. The hard disk device includes a plurality of hard disks 262 which are attached to spindle motor 261. For each hard disk 262, two opposing sliders 210 are disposed with hard disk 262 interposed. In addition, the voice coil motor includes permanent magnets 263 which are arranged at positions which confront each other with coil 253 of head stack assembly 250 interposed.

With the exception of sliders 210, head stack assembly 250 and the actuators correspond to the positioning device in the present invention and serve to both support and position sliders 210 with respect to hard disks 262.

In the hard disk device of the present embodiment, the actuators move sliders 210 in a direction transverse to the tracks of hard disks 262 and position sliders 210 with respect to hard disks 262. The thin-film magnetic heads which are included in sliders 210 record information to hard disks 262 by means of recording heads and reproduce information which has been recorded in hard disks 262 by means of reproducing heads.

The head gimbal assembly and hard disk device according to the present embodiment exhibit the same effects as the thin-film magnetic head according to the previously described present embodiment.

The present invention is not limited to the above-described embodiment and is open to a variety of modifications. For example, thin-film coil 12 in the present invention may be configured from a plurality of layers. Second yoke layer 10b may be curved from the end on the ABS side to a portion which is arranged on thin-film coil 12. Still further, the end of second yoke layer 10b on the ABS side may be exposed to air bearing surface ABS.

Although the description in the present embodiment regards a thin-film magnetic head having a construction in which MR element for reading is formed on the base side and inductive magnetic transducer for writing is disposed above the MR element, the order of disposition may be reversed.

In addition, the present invention can also be applied to a thin-film magnetic head which is dedicated to recording which is provided only with inductive magnetic transducer, or to a thin-film magnetic head for recording and reproducing by means of inductive magnetic transducer.

Although certain preferred embodiments of the present invention have been shown and described in detail, it should be understood that various changes and modifications may be made without departing from the spirit or scope of the appended claims.

What is claimed is:

1. A thin-film magnetic head, comprising:
   first and second magnetic layers each including a magnetic pole tip which confronts each other at an air bearing surface of the head which confronts a recording medium, and being magnetically connected to each other at a remote position from the air bearing surface;
   a recording gap layer which is provided between said magnetic pole tip of said first magnetic layer and said magnetic pole tip of said second magnetic layer;
   a thin-film coil being at least partially disposed between said first and second magnetic layers, and at least partially insulated from said first and second magnetic layers; and
   a substrate;
   wherein:
   said first and second magnetic layers, said recording gap layer, and said thin-film coil are stacked on said substrate, wherein said first magnetic layer is arranged closer to said substrate;
   said first magnetic layer includes a first magnetic pole tip layer which includes said magnetic pole tip of said first magnetic layer, and a first yoke layer which is connected to said first magnetic pole tip layer;
   said first yoke layer includes in a region in which the first yoke layer confronts said first magnetic pole tip layer, an extended part which is relatively thick and a reduced part which is relatively thin, said extended part being positioned on a side of said air bearing surface;
   said first magnetic pole tip layer is connected to said first yoke layer at said extended part and magnetically insulated from said first yoke layer at said reduced part;
   said second magnetic layer includes a second magnetic pole tip layer which includes said magnetic pole tip of said second magnetic layer and a second yoke layer which is connected to said second magnetic pole tip layer; and
   said first magnetic pole tip layer, said recording gap layer, and said second magnetic pole tip layer have a substantially identical cross-sectional profile in a parallel direction to an upper surface of said substrate.

2. A thin-film magnetic head according to claim 1, wherein the following relation is satisfied:

$$W \leq dTH \leq 0.7 \times PED$$

where dTH is a distance from said air bearing surface to said reduced part, PED is a length of said second magnetic pole tip layer in a direction perpendicular to said air bearing surface, and W is a track direction width of said magnetic pole tip.

3. A head gimbal assembly. comprising:

a slider which is disposed so as to confront a recording medium and which includes a thin-film magnetic head; and a suspension for elastically supporting said slider:

said thin-film magnetic head, comprising:

first and second magnetic layers each including a magnetic pole tip which confronts each other at an air bearing surface of the head which confronts a recording medium, and being magnetically connected to each other at a remote position from the air bearing surface;

a recording gap layer which is provided between said magnetic role tip of said first magnetic layer and said magnetic pole tip of said second magnetic layer;

a thin-film coil being at least partially disposed between said first and second magnetic layers, and at least partially insulated from said first and second magnetic layers; and a substrate;

wherein:

said first and second magnetic layers, said recording gap layer, and said thin-film coil are stacked on said substrate, wherein said first magnetic layer is arranged closer to said substrate;

said first magnetic layer includes a first magnetic role tip layer which includes said magnetic role tip of said first magnetic layer, and a first yoke layer which is connected to said first magnetic pole tip layer;

said first yoke layer includes, in a region in which the first yoke layer confronts said first magnetic pole tip layer, an extended part which is relatively thick and a reduced part which is relatively thin, said extended part being positioned on a side of said air bearing surface;

said first magnetic role tip layer is connected to said first yoke layer at said extended part and magnetically insulated from said first yoke layer at said reduced part;

said second magnetic layer includes a second magnetic pole tip layer which includes said magnetic pole tip of said second magnetic layer and a second yoke layer which is connected to said second magnetic pole tip layer; and said first magnetic pole tip layer, said recording gap layer, and said second magnetic pole tip layer have a substantially identical cross-sectional profile in a parallel direction to an upper surface of said substrate.

4. A head arm assembly. comprising:

a head gimbal assembly, said head gimbal assembly comprising: a slider which is disposed so as to confront a recording medium and which includes a thin-film magnetic head; and a suspension for elastically supporting said slider; and an arm on which said head gimbal assembly is installed;

said thin-film magnetic head, comprising:

first and second magnetic layers each including a magnetic pole tip which confronts each other at an air bearing surface of the head which confronts a recording medium, and being magnetically connected to each other at a remote position from the air bearing surface;

a recording gap layer which is provided between said magnetic pole tip of said first magnetic layer and said magnetic role tip of said second magnetic layer;

a thin-film coil being at least partially disposed between said first and second magnetic layers, and at least partially insulated from said first and second magnetic layers; and a substrate;

wherein:

said first and second magnetic layers, said recording gap layer, and said thin-film coil are stacked on said substrate, wherein said first magnetic layer is arranged closer to said substrate;

said first magnetic layer includes a first magnetic pole tip layer which includes said magnetic pole tip of said first magnetic layer, and a first yoke layer which is connected to said first magnetic role tip layer;

said first yoke layer includes, in a region in which the first yoke layer confronts said first magnetic role tip layer, an extended part which is relatively thick and a reduced part which is relatively thin, said extended part being positioned on a side of said air bearing surface;

said first magnetic pole tip layer is connected to said first yoke layer at said extended part and magnetically insulated from said first yoke layer at said reduced part;

said second magnetic layer includes a second magnetic pole tip layer which includes said magnetic pole tip of said second magnetic layer and a second yoke layer which is connected to said second magnetic pole tip layer; and said first magnetic pole tip layer, said recording gap layer, and said second magnetic role tip layer have a substantially identical cross-sectional profile in a parallel direction to an upper surface of said substrate.

5. A head stack assembly. comprising:

a carriage which is provided with a plurality of arms; and head gimbal assemblies which are each installed on the respective arm of said carriage, said head gimbal assemblies each comprising:

a slider which is disposed so as to confront a recording medium and which includes a thin-film magnetic head; and a suspension for elastically supporting said slider;

said thin-film magnetic head, comprising:

first and second magnetic layers each including a magnetic role tip which confronts each other at an air bearing surface of the head which confronts a recording medium, and being magnetically connected to each other at a remote position from the air bearing surface;

a recording gap layer which is provided between said magnetic pole tip of said first magnetic layer and said magnetic role tip of said second magnetic layer;

a thin-film coil being at least partially disposed between said first and second magnetic layers, and at least partially insulated from said first and second magnetic layers; and a substrate;

wherein:

said first and second magnetic layers, said recording gap layer, and said thin-film coil are stacked on said substrate, wherein said first magnetic layer is arranged closer to said substrate;

said first magnetic layer includes a first magnetic pole tip layer which includes said magnetic role tip of said first magnetic layer, and a first yoke layer which is connected to said first magnetic pole tip layer;

said first yoke layer includes, in a region in which the first yoke layer confronts said first magnetic pole tip layer, an extended part which is relatively thick and a reduced part which is relatively thin, said extended part being positioned on a side of said air bearing surface;

said first magnetic pole tip layer is connected to said first yoke layer at said extended part and magnetically insulated from said first yoke layer at said reduced part;

said second magnetic layer includes a second magnetic pole tip layer which includes said magnetic pole tip of said second magnetic layer and a second yoke layer which is connected to said second magnetic pole tip layer; and said first magnetic pole tip layer, said recording gap layer, and said second magnetic pole tip layer have a substantially identical cross-sectional profile in a parallel direction to an upper surface of said substrate.

6. A hard disk device, comprising:

a slider which is disposed so as to confront a disk-shaped recording medium which is rotatably driven and which includes a thin-film magnetic head; and a positioning device for both supporting said slider and positioning said slider with respect to said recording medium;

said thin-film magnetic head, comprising:

first and second magnetic layers each including a magnetic pole tip which confronts each other at an air bearing surface of the head which confronts a recording medium, and being magnetically connected to each other at a remote position from the air bearing surface;

a recording gap layer which is provided between said magnetic pole tip of said first magnetic layer and said magnetic pole tip of said second magnetic layer:

a thin-film coil being at least partially disposed between said first and second magnetic layers, and at least partially insulated from said first and second magnetic layers; and a substrate;

wherein:

said first and second magnetic layers, said recording gap layer, and said thin-film coil are stacked on said substrate, wherein said first magnetic layer is arranged closer to said substrate;

said first magnetic layer includes a first magnetic pole tip layer which includes said magnetic pole tip of said first magnetic layer, and a first yoke layer which is connected to said first magnetic role tip layer;

said first yoke layer includes, in a region in which the first yoke layer confronts said first magnetic pole tip layer, an extended part which is relatively thick and a reduced part which is relatively thin, said extended part being positioned on a side of said air bearing surface;

said first magnetic pole tip layer is connected to said first yoke layer at said extended part and magnetically insulated from said first yoke layer at said reduced part;

said second magnetic layer includes a second magnetic pole tip layer which includes said magnetic pole tip of said second magnetic layer and a second yoke layer which is connected to said second magnetic pole tip layer; and said first magnetic pole tip layer, said recording gap layer, and said second magnetic role tip layer have a substantially identical cross-sectional profile in a parallel direction to an upper surface of said substrate.

* * * * *